United States Patent
Amerson et al.

(10) Patent No.: US 7,084,910 B2
(45) Date of Patent: Aug. 1, 2006

(54) SYSTEM AND METHOD FOR USING MULTIPLE IMAGES IN A DIGITAL IMAGE CAPTURE DEVICE

(75) Inventors: Frederic C Amerson, Los Altos, CA (US); Paul M. Hubel, Mt. View, CA (US); Donald J Stavely, Windsor, CO (US); Charles H McConica, Corvallis, OR (US); K Douglas Gennetten, Ft Collins, CO (US); Susan Hunter, Fort Collins, CO (US); David K. Campbell, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 685 days.

(21) Appl. No.: 10/071,026

(22) Filed: Feb. 8, 2002

(65) Prior Publication Data

US 2003/0151679 A1    Aug. 14, 2003

(51) Int. Cl.
*H04N 5/262* (2006.01)
(52) U.S. Cl. .................. 348/239; 348/231.6
(58) Field of Classification Search .......... 348/263, 348/43, 49, 135, 221.1, 231.2, 50, 52, 222.1, 348/231.3, 231.6, 231.9, 240.99, 240.3, 239, 348/578, 42; 382/154, 255, 282, 254
See application file for complete search history.

(56) References Cited

U.S. PATENT DOCUMENTS

| | | | |
|---|---|---|---|
| 4,692,010 A * | 9/1987 | Kataoka et al. | 396/281 |
| 4,792,823 A * | 12/1988 | Fujino et al. | 396/63 |
| 4,958,374 A | 9/1990 | Tokita et al. | 382/8 |
| 5,034,986 A | 7/1991 | Karmann et al. | 382/1 |
| 5,067,014 A | 11/1991 | Bergen et al. | 358/105 |
| 5,151,609 A | 9/1992 | Nakagawa et al. | 250/561 |
| 5,172,236 A * | 12/1992 | Takemoto et al. | 348/355 |
| 5,453,784 A * | 9/1995 | Krishnan et al. | 348/348 |
| 5,659,635 A * | 8/1997 | Komatsu et al. | 382/245 |
| 5,815,596 A | 9/1998 | Ahuja et al. | 382/173 |
| 5,917,488 A * | 6/1999 | Anderson et al. | 715/838 |
| 5,920,657 A | 7/1999 | Bender et al. | 382/284 |
| 6,028,625 A * | 2/2000 | Cannon | 348/135 |
| 6,072,529 A * | 6/2000 | Mutze | 348/351 |
| 6,310,647 B1 * | 10/2001 | Parulski et al. | 348/231.99 |
| 6,320,979 B1 * | 11/2001 | Melen | 382/154 |
| 6,330,399 B1 * | 12/2001 | Omura et al. | 396/60 |
| 6,341,201 B1 * | 1/2002 | Ishiguro et al. | 396/56 |
| 6,445,415 B1 * | 9/2002 | Olsson | 348/345 |
| 6,466,220 B1 * | 10/2002 | Cesana et al. | 345/537 |
| 6,525,761 B1 * | 2/2003 | Sato et al. | 348/14.04 |

(Continued)

FOREIGN PATENT DOCUMENTS

JP         2000333210 A  * 11/2000

*Primary Examiner*—Tuan Ho
*Assistant Examiner*—Nelson D. Hernandez

(57) ABSTRACT

A digital image capture and processing system, comprising a lens coupled to a lens control element is disclosed. The image capture system includes an image sensor configured to capture images from the lens, and a memory element and a processor coupled to the lens control element. The memory element includes image capture software, where the image capture software causes the lens and the image sensor to capture at least two images, each of the at least two images captured using a varying parameter and stored as a single file where the at least two images are combined to form a new image having at least one characteristic different from corresponding characteristics of the at least two images.

26 Claims, 8 Drawing Sheets

U.S. PATENT DOCUMENTS

| | | | |
|---|---|---|---|
| 6,667,761 B1 * | 12/2003 | Ludwig et al. | 348/61 |
| 6,700,616 B1 * | 3/2004 | Koch et al. | 348/350 |
| 6,816,627 B1 * | 11/2004 | Ockman | 382/284 |
| 2002/0025161 A1 * | 2/2002 | Seki et al. | 396/287 |
| 2002/0071044 A1 * | 6/2002 | Takahashi et al. | 348/294 |
| 2002/0075389 A1 * | 6/2002 | Seeger et al. | 348/222 |
| 2002/0080148 A1 * | 6/2002 | Uchino | 345/629 |
| 2002/0081014 A1 * | 6/2002 | Ravkin | 382/134 |
| 2002/0118217 A1 * | 8/2002 | Fujiki | 345/623 |
| 2003/0058354 A1 * | 3/2003 | Parulski et al. | 348/231.6 |
| 2003/0071909 A1 * | 4/2003 | Peters | 348/349 |
| 2003/0117412 A1 * | 6/2003 | Brooksby et al. | 345/589 |
| 2003/0128287 A1 * | 7/2003 | Fredlund et al. | 348/333.02 |
| 2003/0133007 A1 * | 7/2003 | Iijima et al. | 348/46 |
| 2003/0142877 A1 * | 7/2003 | George et al. | 382/254 |
| 2003/0151679 A1 * | 8/2003 | Amerson et al. | 348/231.6 |
| 2003/0169349 A1 * | 9/2003 | Aoi et al. | 348/231.2 |

* cited by examiner

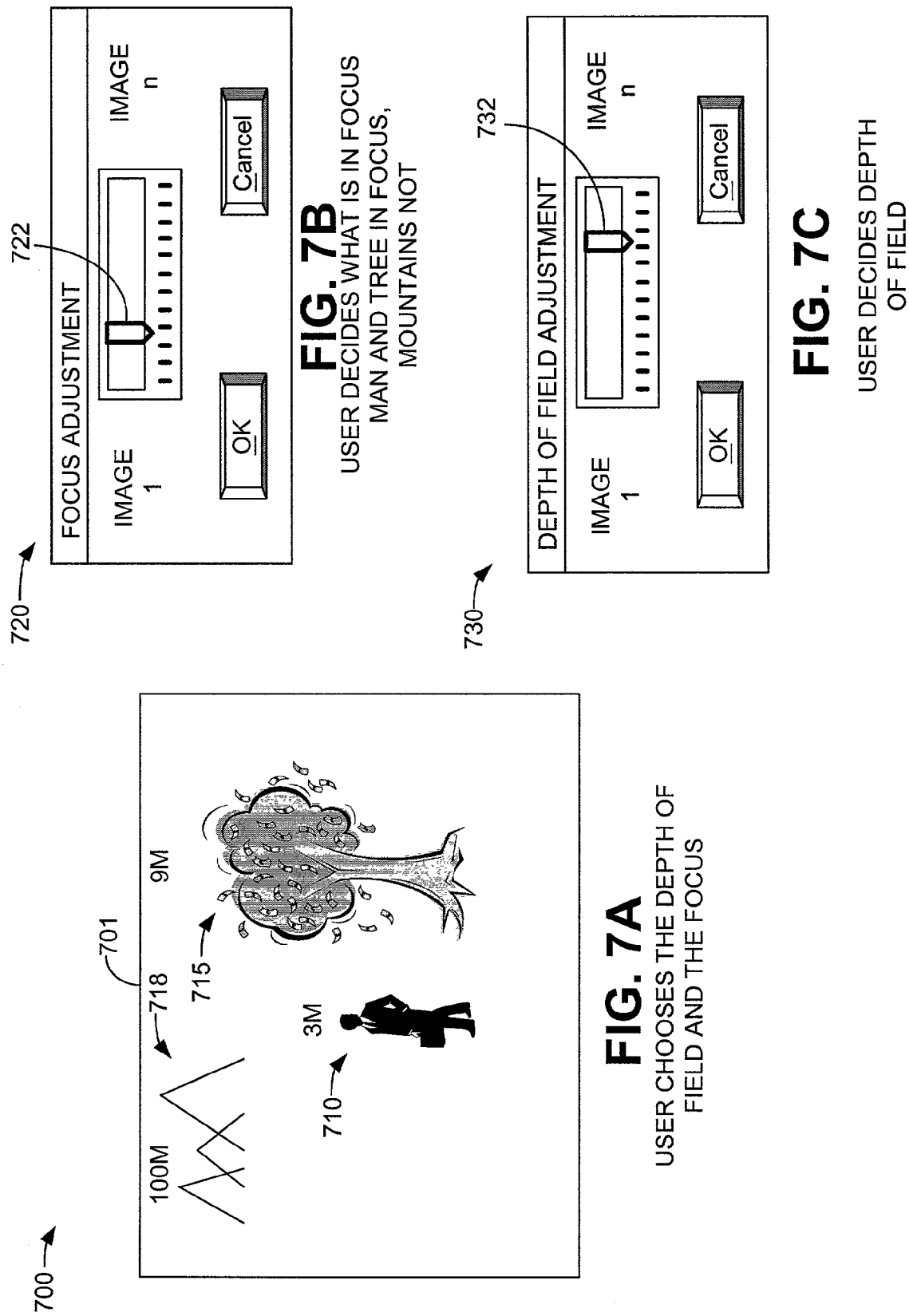

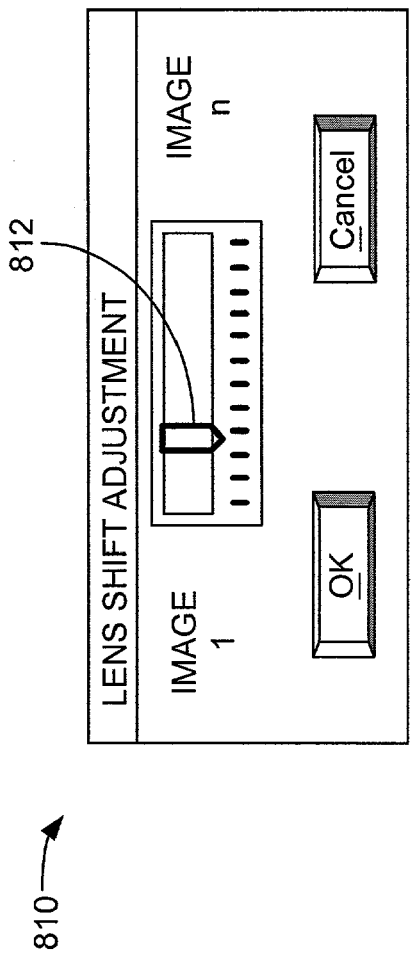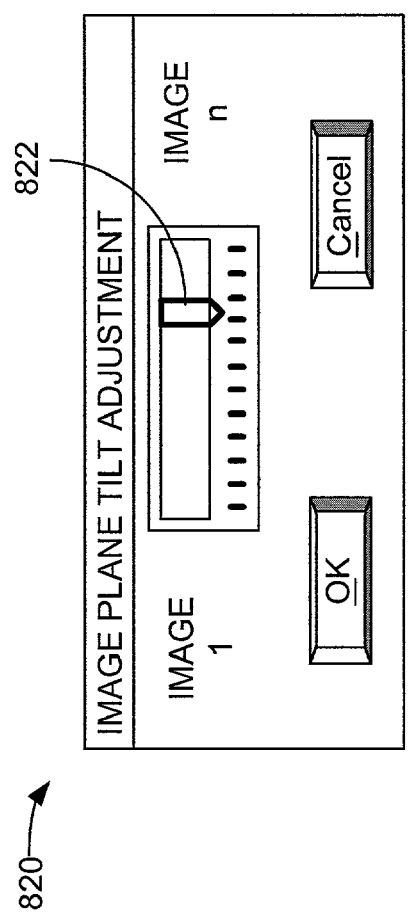

SYSTEM AND METHOD FOR USING MULTIPLE IMAGES IN A DIGITAL IMAGE CAPTURE DEVICE

TECHNICAL FIELD

The present invention relates generally to digital photography, and, more particularly, to a digital image capture and processing system and method for using multiple images to improve a final image in a digital image capture device.

BACKGROUND OF THE INVENTION

With the proliferation of low cost microprocessors, memory and image capture electronics, digital cameras and digital video cameras are gaining in popularity and are becoming more and more widely available to a larger number of consumers. One of the advantages that a digital camera enjoys over a conventional film camera is that when a digital camera captures an image, the image is stored electronically in a memory element associated with the camera and available for further electronic manipulation. Conversely, when a conventional still camera captures an image, the image is permanently exposed on a physical film, and therefore, not available for further manipulation.

Another advantage that a digital camera enjoys over a conventional film camera is the ability to rapidly capture multiple images of the "same" photograph. These multiple images can be captured at a rate approaching many tens or hundreds of images per second. Having the ability to capture many images for each photograph raises the possibility of using the multiple images to produce a final photograph (or picture) that has a quality significantly more desirable than that available using a convention camera that can only capture one image per photograph. Some conventional video cameras use multiple exposures to develop a single image having enhanced resolution by combining information from a series of de-interlaced video frames. Unfortunately, these video cameras are limited to resolution enhancement and require complex and sophisticated external processing devices.

Therefore, there is a need in the industry for a way to exploit the ability of a digital camera to capture multiple images to provide a high quality photograph.

SUMMARY OF THE INVENTION

Embodiments of the invention include a system and method for using the multiple images available from a digital camera to produce a new image in which features and aspects of the multiple images are combined to produce a new image having at least one characteristic different from corresponding characteristics of the at least two images. For example, if each of the at least two images is each captured at a different focus distance, the new image may have an apparent focus distance between the focus distance of each of the at least two images.

In one embodiment, the invention is a digital image capture and processing device, comprising a lens coupled to a lens control element, an image sensor configured to capture images from the lens, and a memory element and a processor coupled to the lens control element. The memory element includes image capture software, where the image capture software cause the lens and the image sensor to capture at least two images, each of the at least two images captured using a varying parameter and stored as a single file where the at least two images are combined to form a new image having at least one characteristic different from corresponding characteristics of the at least two images.

Related methods of operation and computer readable media are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

Embodiments of the present invention, as defined in the claims, can be better understood with reference to the following drawings. The components within the drawings are not necessarily to scale relative to each other, emphasis instead being placed upon clearly illustrating the principles of the present invention.

FIGS. 7A through 7C collectively illustrate an alternative embodiment of the invention in which the multiple exposures can be combined into a single image in which both the focal length of each image and the depth of field of each image can be selected by the user.

FIGS. 8A and 8B collectively illustrate another alternative embodiment of the invention.

DETAILED DESCRIPTION OF THE PREFERRED EMBODIMENT

Figure 1:
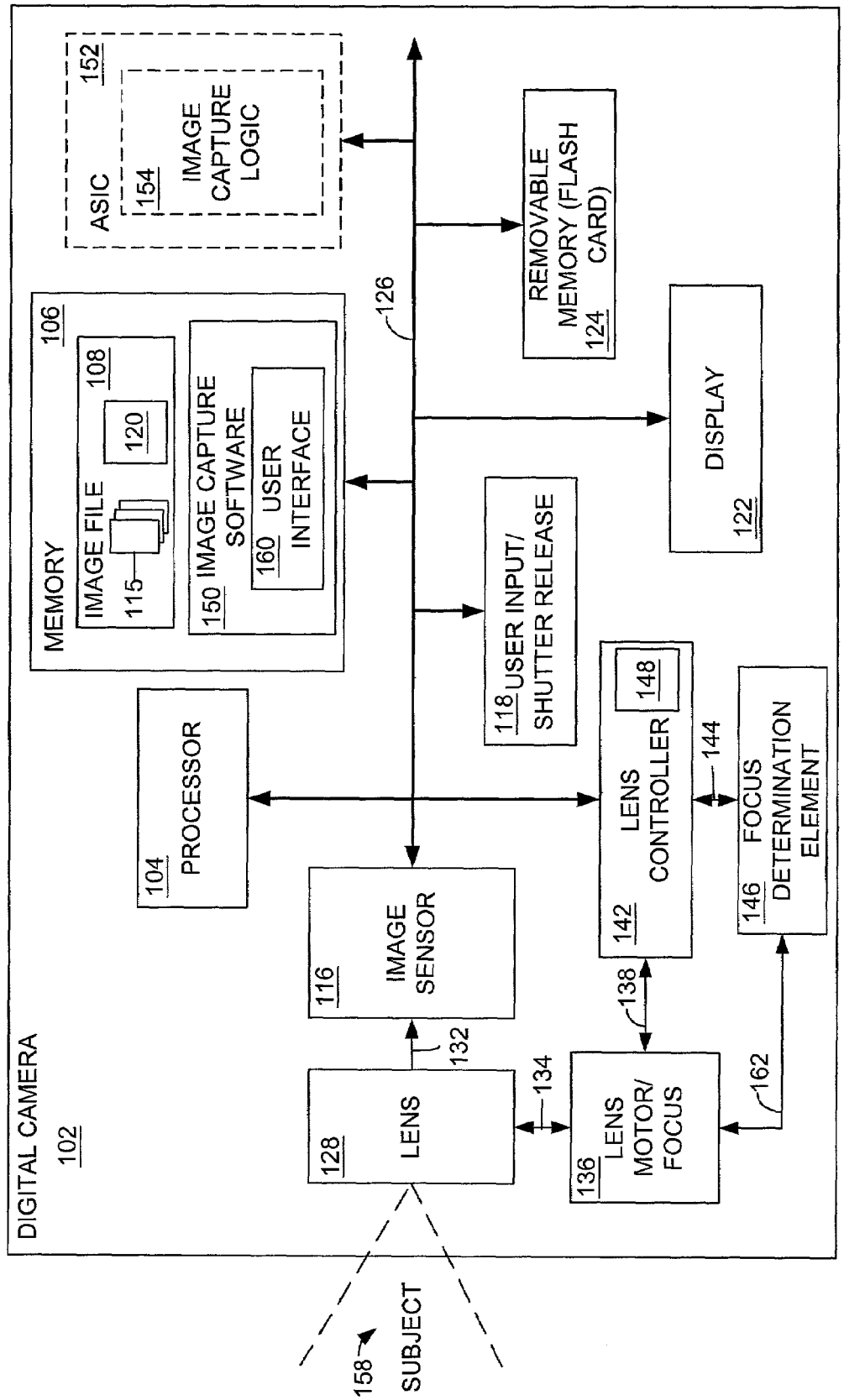
FIG. 1 is a schematic view illustrating a digital camera constructed in accordance with an embodiment of the invention.

The invention described hereafter is applicable to any digital camera that can capture multiple images. Furthermore, while described below in the context of a user configurable system, the system for combining multiple images in a digital camera is equally applicable to an automatic system for combining multiple images.

The system and method for combining multiple images in a digital camera can be implemented in hardware, software, firmware, or a combination thereof In the preferred embodiment(s), the invention is implemented using a combination of hardware and software or firmware that is stored in a memory and that is executed by a suitable instruction execution system. The hardware portion of the invention can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. Software or firmware could be implemented in a microprocessor, digital signal processor (DSP), reduced instruction set computer (RISC), or special purpose programmable processor.

The program for combining multiple images in a digital camera, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical disk (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Turning now to the drawings, FIG. 1 is a schematic view illustrating a digital camera 102 constructed in accordance with an embodiment of the invention. The digital camera 102 includes a processor 104, memory 106, image sensor 116, lens controller 142, user input element 118, display 122, and removable memory element 124 coupled together via logical bus 126. The processor 104 can be a special purpose or general purpose processor, such as a microprocessor, that can execute the software stored in the memory 106. The memory 106 includes a number of software elements and storage locations, and can include, for example but not limited to, both volatile and non-volatile memory. For example, the memory element 106 can be random access memory (RAM), read only memory (ROM), or flash memory. When the digital camera 102 captures images, the images are stored in the memory element 106 as an image file 108 (to be described in further detail below). The memory element 106 also includes multiple image capture software 150 and a user interface 160.

While described herein as implemented using software that is stored in memory 106 and implemented in the processor 104, the invention can also be implemented using an application specific integrated circuit (ASIC) 152 that includes image capture logic 154. In such an embodiment, the functionality of the multiple image capture software 150 and the processor 104 to be described below can be included in the ASIC 152.

The user input element 118 includes buttons and controls that allow a user to operate the digital camera 102, and may also include, for example, a mouse, pointer, keypad, shutter release button, or any other user interface elements of the digital camera 102. The display 122, which can be, for example, a liquid crystal display (LCD), or any other type of display element, allows a user of the digital camera 102 to view captured images and other camera operating parameters. The removable memory element 124 can be, for example, a non-volatile memory such as a removable flash card.

The image sensor 116, which can be, for example but not limited to, a charge coupled device (CCD), or complimentary metal oxide semiconductor (CMOS) sensor, receives input from the lens 128 via connection 132. The lens 128 is directed toward a subject 158. The lens 128 captures images of the subject 158 and transfers those images via connection 132 to the image sensor 116. The image sensor 116 converts the image of the subject 158 into an electronic format that is stored in the memory 106. In accordance with an embodiment of the invention, the image sensor 116 captures multiple images of the subject 158 and stores the multiple images in the memory 106 as image file 108.

The lens controller 142 communicates with the lens motor 136 via connection 138. The lens motor communicates with the lens 128 via connection 134. The focus determination element 146 communicates with the lens controller 142 via connection 144 and with the lens motor 136 via connection 162. The lens controller 142, focus determination element 146 and the lens motor 136 operate in unison to focus the lens 128 on the subject 158 and determine whether the lens is properly focused. The lens controller also includes a lens position indicator 148 to communicate the position of the lens 128 to the processor 104.

In accordance with an embodiment of the invention, the lens 128 and the image sensor 116 capture multiple images of the subject 158. These multiple images 115 are stored in the memory element 106 as a single image file 108. The multiple images 115 are taken in succession and with one or more varying parameters so that each of the multiple images will provide an image of the subject 158 with some slight difference between them.

For example, in one embodiment of the invention, each of the images 115 is taken at a different focus distance. The multiple images may be similar. Images are similar when they have sufficient elements in common that allows them to be matched to one another to allow processing as described herein. Images of the same scene displaced in time or space are considered similar. Further, the similar images may differ primarily in color where the color difference may be from a different color light or light having a different color temperature from that of the original exposure. The two images may also differ in exposure, illumination, and depth of field. Further, one of the two similar images may be captured using a first photography mode, such as conventional photography using visible light, and the second of the similar images is captured using a second photography mode, such as infrared exposure. Further still, one of the multiple images may be stored in the image sensor 116 if the image sensor 116 is implemented as a CMOS sensor.

Alternatively, a stereo-like camera could also capture multiple images displaced in space. Further, an image could be split (e.g. using a prism) within the camera so that a single image is captured using two or more different conditions, possibly focus for example. However, such alternative implementations may require multiple image sensors.

Furthermore, multiple images may be captured where the variance between the multiple images is sufficiently small that the difference can be neglected when compositing the multiple images into a single, improved image. The two images could be a fraction of a second apart or a year apart in time, for example, provided that the difference in time does not overwhelm the effect intended to be created by combining the two images.

Although only three images 115 are shown in the image file 108, any number of images 115 can be captured by the image sensor 116 and stored in the memory 106. In accordance with an embodiment of the invention, a user is presented with a user interface 160 (via the multiple image capture software 150) through the display 122 and the user input element 118 so that a user may scroll through the multiple images 115 and combine aspects of the multiple images to develop a new image 120. The new image 120 may have different characteristics than any of the three images 115 and can also be stored in image file 108. (This embodiment will be described in further detail below with respect to FIGS. 3 and 4).

The lens controller 142 communicates with the processor 104 and with the lens motor 136 to position the lens 128 at different focus distances for each of the multiple images 115. The focus determination element 146 cooperates with the lens motor 136 and the lens 128 to determine whether an image is in focus. This focus information is supplied to the lens controller 142 via connection 144.

Figure 2:
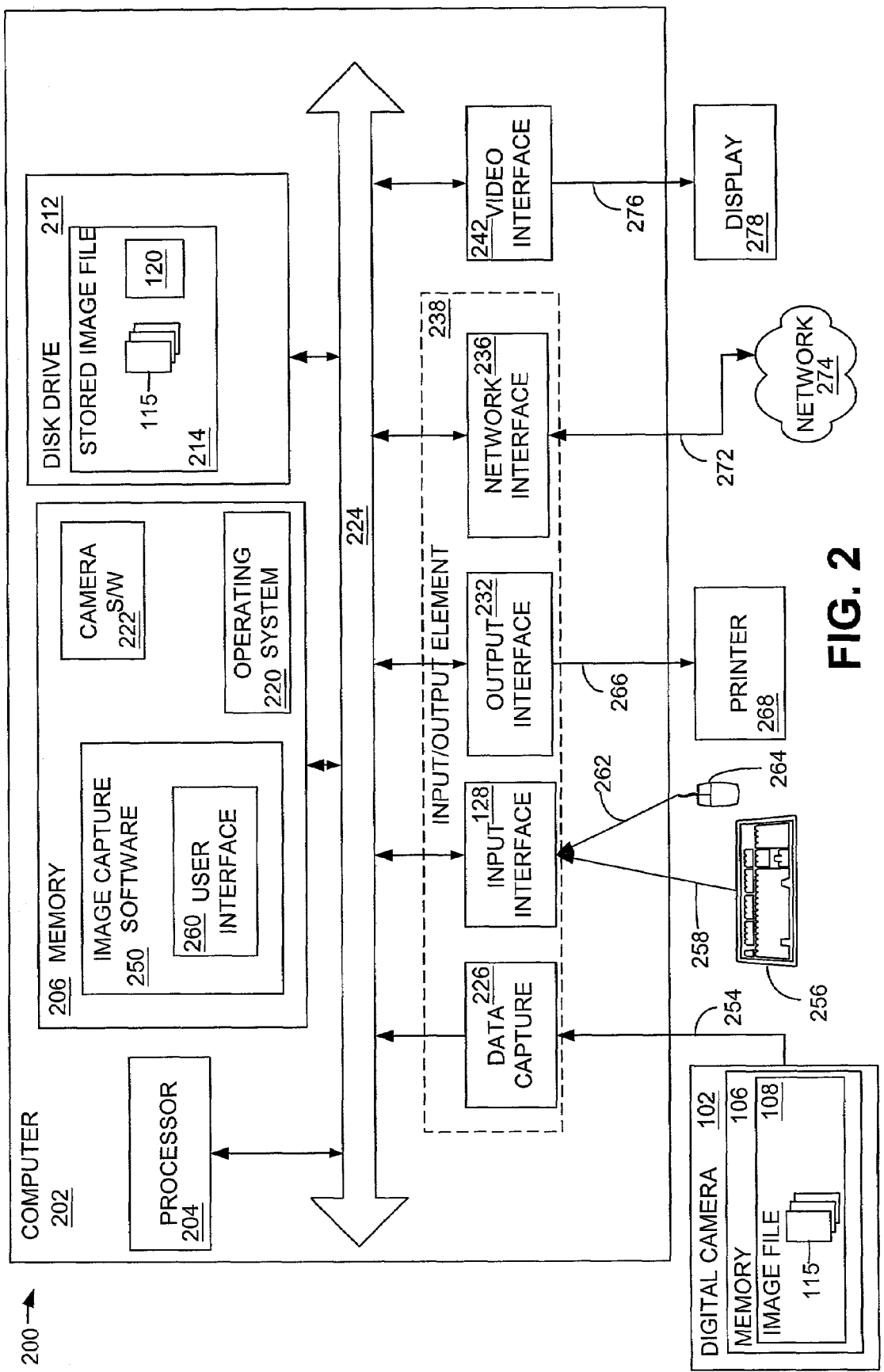
FIG. 2 is a schematic view illustrating an alternative embodiment of the environment in which an embodiment of the invention may be implemented.

FIG. 2 is a schematic view illustrating an alternative embodiment 200 of the environment in which the invention may be implemented. As mentioned above, in one embodiment, the system and method for combining multiple images in a digital camera is implemented primarily in software in a general purpose personal computer, such as the computer 202 shown in FIG. 2.

The computer 202 includes a memory 206, which includes software in the form of multiple image capture software 250. The multiple image capture software 250 includes a user interface 260, and is similar to the multiple image capture software 150 and user interface 160 described above in FIG. 1. The computer 202 also includes other software and hardware elements (to be discussed below) that work in unison to implement the functionality of this embodiment of the invention.

Generally, in terms of hardware architecture, as shown in FIG. 2, the computer 202 includes a processor 204, a memory 206, a disk drive 212, a video interface 242 and an input/output element 238 that are connected together and can communicate with each other via a local interface 224. The local interface 224 can be, for example but not limited to, one or more buses or other wired or wireless connections, as is known to those having ordinary skill in the art. The local interface 224 may have additional elements, which are omitted for simplicity, such as buffers (caches), drivers, and controllers, to enable communications. Further, the local interface 224 includes address, control, and data connections to enable appropriate communications among the aforementioned components. The input/output element 238 includes a data capture element 226, an input interface 228, an output interface 232 and a network interface 236 each in communication with the local interface 224. The disk drive 212 can be any storage element or memory device, and as used herein, refers to a computer hard disk drive.

The processor 204 is a hardware device for executing software that can be stored in memory 206. The processor 204 can be any custom made or commercially available processor, a central processing unit (CPU) or an auxiliary processor among several processors associated with the computer 202, and a microchip-based microprocessor or a macroprocessor. Examples of suitable commercially available microprocessors are as follows: a PA-RISC series microprocessor from Hewlett-Packard Company, an 80×86 or Pentium series microprocessor from Intel Corporation, a PowerPC microprocessor from IBM Corporation, a Sparc microprocessor from Sun Microsystems, Inc., or a 68xxx series microprocessor from Motorola Corporation.

The memory 206 can include any one or a combination of volatile memory elements (e.g., random access memory (RAM, such as DRAM, SRAM, etc.)) and nonvolatile memory elements (e.g., RAM, ROM, hard drive, tape, CDROM, etc.). Moreover, the memory 206 may incorporate electronic, magnetic, optical, and/or other types of storage media. Note that the memory 206 can have a distributed architecture, where various components are situated remote from one another, but can be accessed by the processor 204.

The input interface 128 can receive commands from, for example, keyboard 256 via connection 258 and from mouse 264 via connection 262 and transfer those commands over the local interface 224 to the processor 204 and the memory 206.

In accordance with an embodiment of the invention, a digital camera 102 is coupled to the computer 202 via connection 254 and via the data capture element 226. The data capture element 226 is component of the input/output element 238 and receives inputs from the digital camera 102. As described above, the digital camera 102 includes a memory 106. The memory 106 can be any type of memory employed in digital cameras, and can be, for example, but not limited to, a fixed or removable memory media. The digital camera 102 stores multiple images in the form of a single image file 108. The image file 108 includes at least two images 115.

When digital images 115 are captured and stored as image file 108 in a digital camera 102, it is often desirable to transfer the image file 108 from the memory 106 to, for example, a computer 202. When the image file 108 is transferred to the computer 202, the image file 108 can be stored in the disk drive 212 as a stored image file 214.

Alternatively, the image file 108 can be stored in any storage device, for example but not limited to, a memory, a disk, or any other storage element. The stored image file 214 includes the plurality of images 115 that comprise the image file 108 and includes the new image 120. The stored image file 214, and more particularly, each of the images 115, can be further manipulated, as will be described below.

The video interface 242 supplies a video output signal via connection 276 to the display 278. The display 278 can be a conventional CRT based display device, or can be any other display device, such as a liquid crystal display (LCD) or other type of display on which a user of the computer 202 is presented with a user interface to view and manipulate the images 115 in the stored image file 214.

The output interface 232 sends printer commands via connection 266 to the printer 268 so that desired images can be printed. The network interface 236, can be, for example, a network interface card located in the computer 202, a dial-up modulator/demodulator (modem), a digital subscriber line (DSL) transceiver or cable modem, or any other communication device capable of connecting the computer 202 to an external network 274. For example, in an alternative implementation, the camera 102 may couple to the computer 202 via a network 274. The network 274 may be, for example, a local area network (LAN) or a wide area network (WAN).

The software in memory 206 may include one or more separate programs, each of which comprise one or more code segments, which are an ordered listing of executable instructions for implementing logical functions. In the example of FIG. 2, the software in the memory 206 includes the multiple image capture software 250, which includes a user interface 260. The memory 206 also includes camera software 222, which allows a user of the computer 202 to, for example, upload, print, manipulate, and view the images 115 in the stored image file 214, and a suitable operating system (O/S) 220. While described above as storing the image file 108 in the disk drive 212, the invention is also applicable if the image file 214 remains on the digital camera 102.

The multiple image capture software 250, as described above, allows a user of the computer 202 and the digital camera 102 to manipulate multiple captured images so that a single image 120 that exhibits desired features from one or more of the multiple images 115 can be composed.

With respect to the operating system 220, a non-exhaustive list of examples of suitable commercially available operating systems 220 is as follows: a Windows operating system from Microsoft Corporation, MacOS operating system from Apple Computer, a Netware operating system available from Novell, Inc., or a UNIX operating system, which is available for purchase from many vendors, such as Hewlett-Packard Company and Sun Microsystems, Inc. The operating system 220 essentially controls the execution of other computer programs, such as the multiple image capture software 250, and provides scheduling, input-output control, file and data management, memory management, and communication control and related services. The processor 204 and operating system 220 define a computer platform, for which application programs, such as the multiple image capture software 250 and the camera software 222, in higher level programming languages are written.

If the computer 202 is a PC, the software in the memory 206 further includes a basic input output system (BIOS) (omitted for simplicity). The BIOS is a set of essential software routines that test hardware at startup, start the O/S 220, and support the transfer of data among the hardware devices. The BIOS is stored in ROM so that it can be executed when the computer 102 is activated.

When the computer 202 is in operation, the processor 204 is configured to execute software stored within the memory 206, to communicate data to and from the memory 206 and to generally control operations of the computer 202 pursuant to the software. The multiple image capture software 250, camera software 222 and the O/S 220, in whole or in part, but typically the latter, are read by the processor 204, perhaps buffered within the processor 204, and then executed.

When the system and method for using multiple images is implemented primarily in software, as is shown in FIGS. 1 and 2, it should be noted that the multiple image capture software 250 and the camera software 222 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The multiple image capture software 250 and the camera software 222 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a non-exhaustive list) of the computer-readable medium include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The hardware components of the system and method for using multiple images can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

Figure 3:
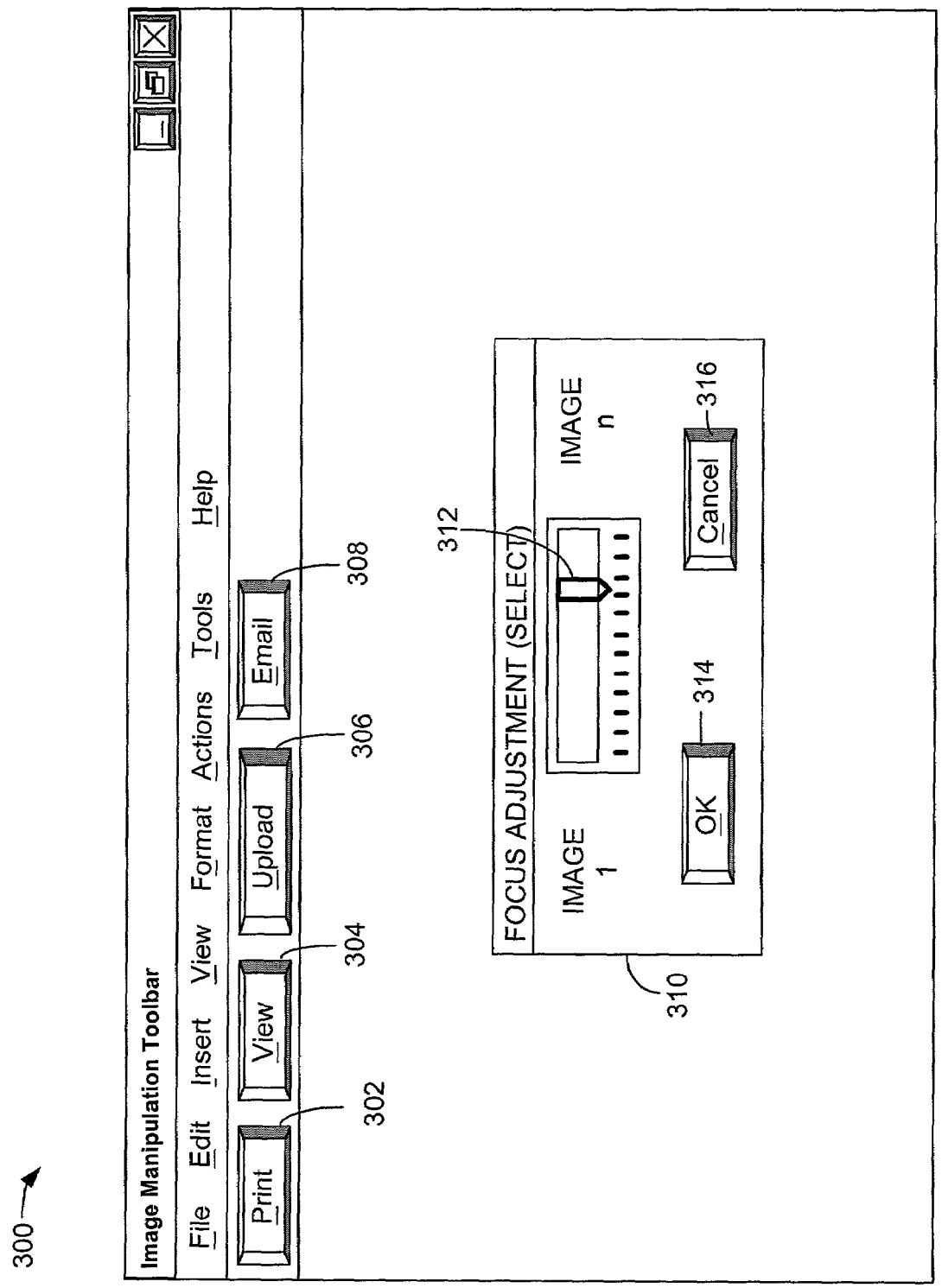
FIG. 3 is a block diagram illustrating an exemplar graphical user interface (GUI) presented to a user of the computer by the user interface software of FIG. 2 or the user interface of FIG. 1.

FIG. 3 is a block diagram illustrating an exemplar graphical user interface (GUI) 300 presented to a user of the computer 202 by the user interface software 260 of FIG. 2 or the user interface 160 of FIG. 1. While the GUI 300 can be presented to a user via the camera display 122 or the display 278 associated with the computer 202, the GUI 300 will be described with reference to the computer 202. The GUI 300 is presented to a user of the computer 202 when the user wishes to view the multiple captured images to compose a single photograph. It should be mentioned that the GUI 300 presented to the user is merely one possible non-limiting example of a possible user interface. Many alternative implementations may be possible.

When the user interface software 260 in the multiple image capture software 250 is activated, the GUI 300 presents the user of the computer 202 with a series of choices. For example, the GUI 300 may present the user with a dialog box 310 that allows the user to select one of the plurality of images 115 that has the focus desired by the user. The dialog box 310 includes, for example, a slider 312 that the user manipulates using the mouse 264 (FIG. 2) to scroll through the multiple images 115 (denoted in FIG. 3 as images 1 through n) and select the one image that the user desires to use as the photograph. This allows a user to "select focus" after two or more images are captured.

Figure 4:
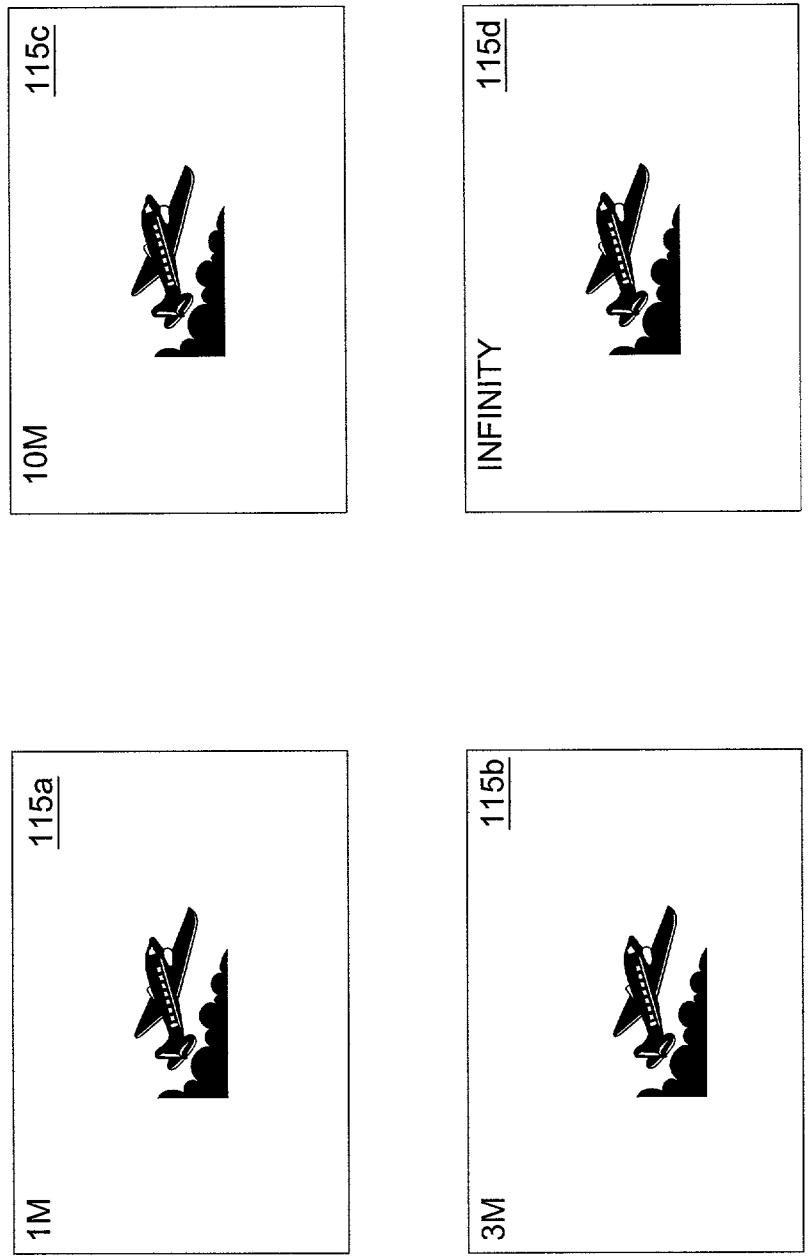
FIG. 4 is a graphical illustrating showing exemplar multiple images captured using the digital camera.

FIG. 4 is a graphical illustration 400 showing exemplar multiple images captured using the digital camera 102. FIG. 4 includes four (4) exemplar images 115a, 115b, 115c and 115d, each captured by the digital camera 102 at a different focus distance. For example, the image 115a is captured at a focus distance of 1 meter (m), the image 115b is captured at a focus distance of 3 m, the image 115c is captured at a focus distance of 10 m and the image 115d is captured at a focus distance of infinity.

Although difficult to discern from the drawing, each of the images in FIG. 4 will appear slightly different because each was captured at a different focus distances. In such a case, the user manipulates the slider 312 (FIG. 3) to scroll though the four images 115a through 115d to select the one that exhibits the focus that the user desires. In an alternative embodiment, the user may manipulate the slider 312 to continuously scroll through the images 115 and blend the images into a single photograph, or new image 120, thus incorporating features of two or more images into the single photograph.

Referring again to FIG. 3, after the user selects the desired image or blends aspects of the plurality of images into a new image 120, the user may press the OK button 314 to advise the multiple image capture software 250 that the user has composed a photograph. At this point, further manipulation may be performed. For example, by pressing button 302 a selected image can be printed. Similarly, by pressing button 304, a selected image can be viewed, by pressing button 306 a selected image can be uploaded, and by pressing button 308 a selected image can be emailed.

Figure 5:
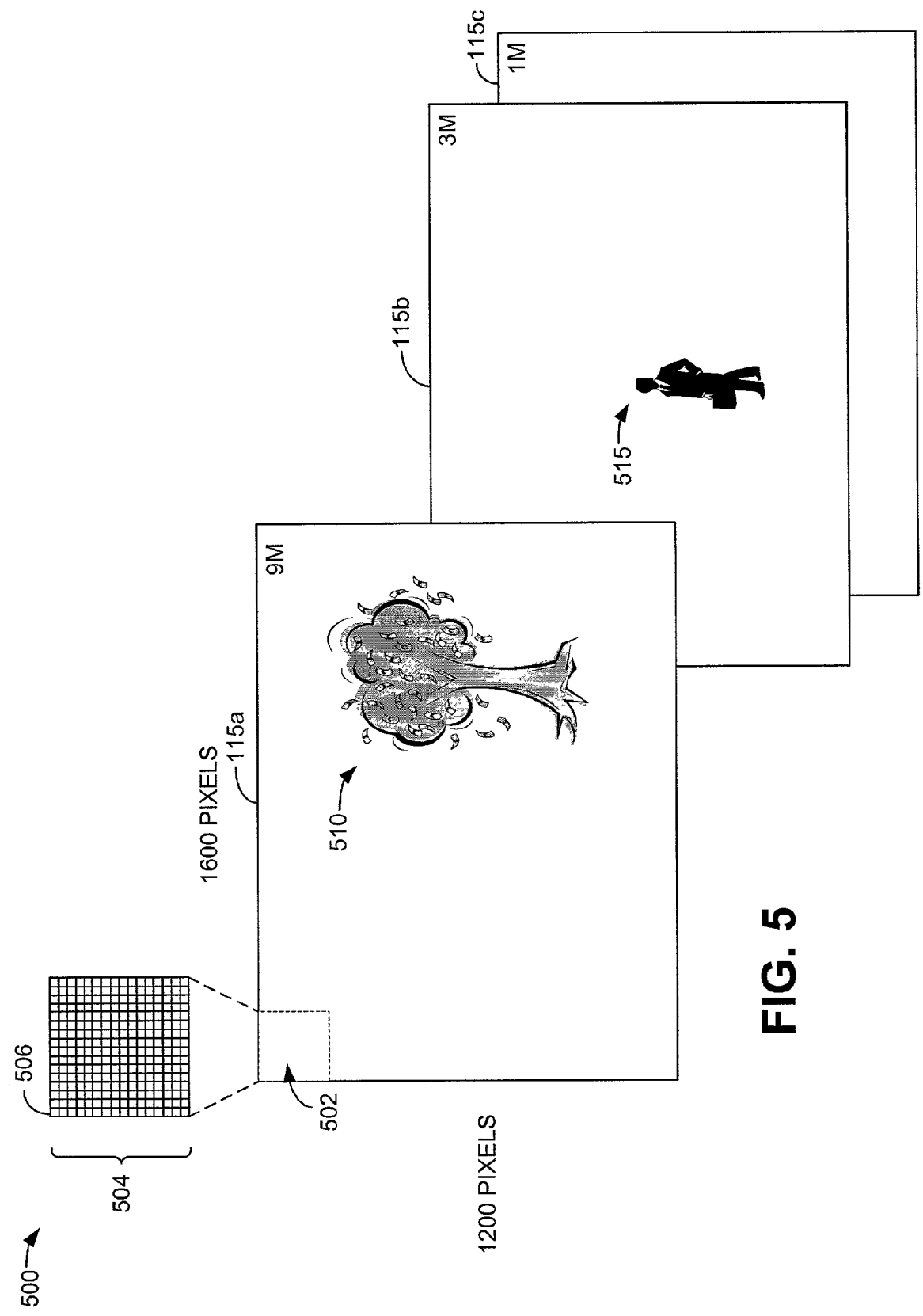
FIG. 5 is a graphical illustration of multiple images captured using the digital camera of FIG. 1.
Figure 6:
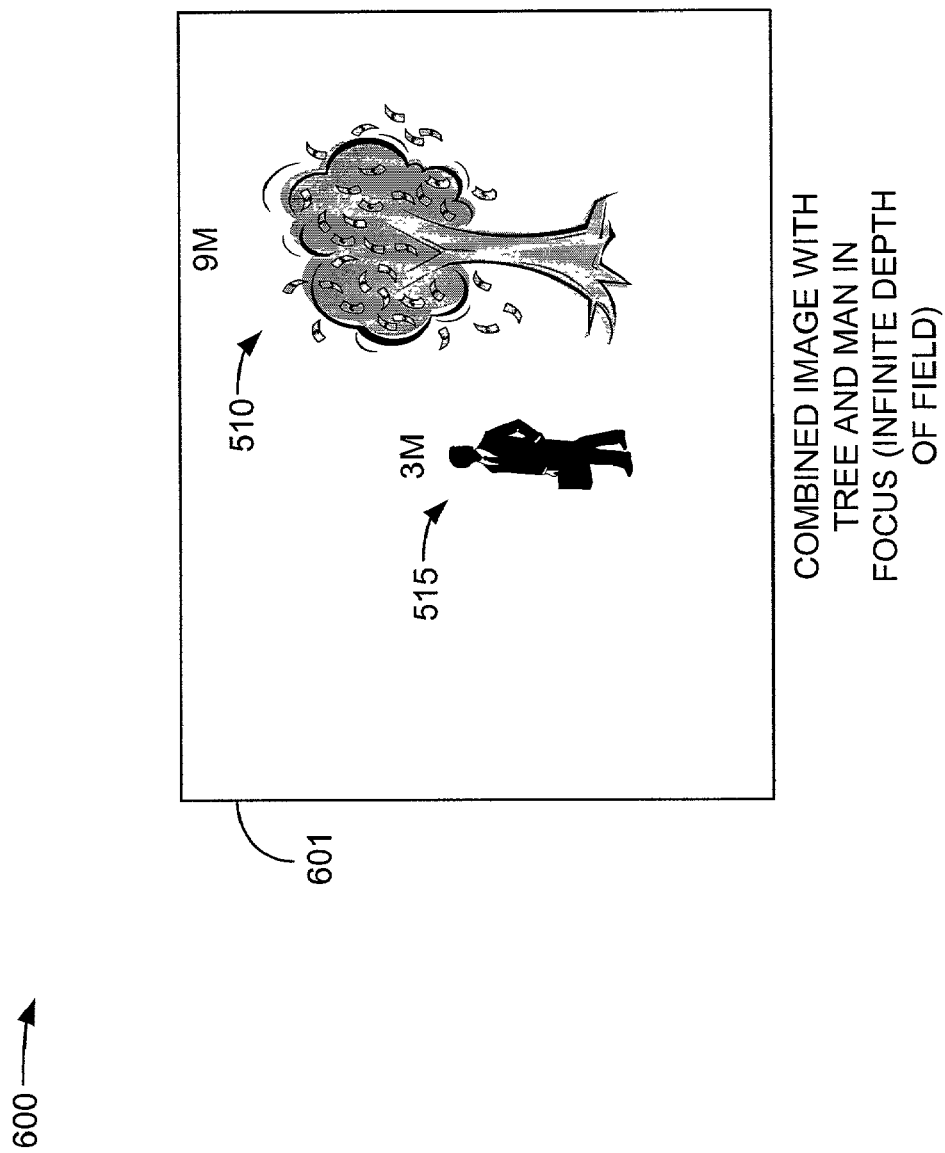
FIG. 6 is a graphical illustration of a single photograph formed from the multiple images of FIG. 5.

FIGS. 5 and 6 will be collectively referred to below to describe an alternative embodiment of the invention. FIG. 5 is a graphical illustration of multiple images 115a, 115b and 115c captured using the digital camera 102 of FIG. 1. Although mentioned above as preferably capturing ten images, for simplicity, the following description will refer to two captured images. Image 115a taken at a 9 m focus distance depicts a tree 510 that is in focus at the 9 m focus distance. Image 115b taken at a 3 m focus distance depicts a man 515 that is in focus at the 3 m focus distance.

FIG. 6 is a graphical illustration of a single photograph formed from the multiple images of FIG. 5. In FIG. 6, a single image 601 is composed by the user of the computer 202 using the user interface 260, whereby the single image includes both the in-focus subject 510 of image 115a of FIG. 5 and the in-focus subject 515 of image of 115b of FIG. 5. For example, the multiple image capture software 250 captures the multiple images shown in FIG. 5 with a lens setting that will produce different depths of field. Then, the multiple image capture software 250 combines the multiple images at the multiple depths of field into a single image 601 that includes both the in-focus subjects of images 115a and 115a. In this manner, the image 601 of FIG. 6 illustrates the ability of the multiple image capture software 250 to merge multiple images into one image having an infinite depth of field. In an alternative implementation, this mode of operation may be selected by a user through the use of a button on the user input element 118 of FIG. 1.

Referring back to FIG. 5, in another aspect of the invention, each of the images 115a, 115b and 115c are divided into a number of regions, an exemplar of one which is illustrating using reference number 502. Each of the regions can be, for example, a 16×16 group of pixels 504, an exemplar pixel being illustrating using reference number 506. The multiple image capture software 150 and the focus determination element 146 cooperate to determine whether each pixel 506 (and hence, each region 502) is in focus.

In this embodiment of the invention, by having information relating to which of the regions 502 are in focus, the image capture software 150 (FIG. 1) can use an alpha channel, known to those having ordinary skill in the art, to assign distance information to each of the pixels 506 within each region of 502. In this manner, the distance between the subject 158 and the digital camera 102 (FIG. 1) for each pixel 506 (and each region 502) can be assigned.

Varying the number of bits used by each pixel in the image sensor can improve the overall quality of an image. In another embodiment of the invention, the quality of an image can be improved by increasing the number of effective bits at pixel locations in an image where movement between multiple images has not occurred. When capturing multiple images, each of the captured images (i.e., 115a, 115b and 115c) is displaced from the previous image by a small amount of time. This time can vary from a minimum time allowed by the characteristics of the image sensor 116 to longer periods of time determined by the movement of the captured objects. The image capture software 150 can vary the number of effective bits that each pixel 506 uses to capture each image 115a, 115b and 115c. Varying the number of effective bits used by each pixel 506, varies the effective bit depth available from pixel to pixel and the signal-to-noise ratio of each pixel.

For example, areas of the image, such as shadows where less light is available can have greater effective bit depth than the rest of the image by using this technique. The signal-to-noise ratio of each pixel (e.g., pixel 506) determines the number of effective bits that will be used by that pixel 506 to display the data. For example, assume that each pixel has 16 bits assigned—that is, the file format of the file allocates 16 bits of memory for each pixel location. Depending on the signal-to-noise ratio of the data corresponding to that pixel, all 16 bits may not be used to characterize the data for the pixel. In normal camera operation, a fixed number of bits (typically 10–12 bits) are used across the image. In the case of an image including a significant portion of shadow, only 8 bits of data may be meaningful for that pixel under normal operation. Averaging multiple samples of the same (or nearly the same) pixels from a range of exposures can reduce the noise for that pixel, and provide an increase in the number of effective bits used by that pixel. This can improve the signal-to-noise ratio of that pixel and improves the accuracy of that pixel.

An extension to the concept of varying the number of bits used by each pixel, is to use a motion estimation algorithm to predict the motion of objects that are moving from image to image, thereby allowing greater accuracy for the pixels associated with these moving objects. If the digital camera 102 is also moving, successive images may partially overlap. Matching the overlapped areas allows a composite image to be created that is larger than the image size of each captured image 115. Due to the motion, an exact overlap may not be obtained. Removing the areas of motion allows the remainder of the images to be automatically combined. The area of overlap between the images benefits from the accuracy enhancement described above.

FIGS. 7A through 7C collectively illustrate an alternative embodiment of the invention in which the multiple exposures 115 can be combined into a single image in which both the focus distance of each image and the depth of field of each image can be selected by the user. For example, the image 701 includes a subject 710 taken at 3M, a subject 715 taken at 9M, and a subject 718 taken at 100M. By using the focus adjustment user interface provided in dialog box 720 and the depth of field adjustment user interface provided by dialog box 730, a user can manipulate the respective sliders 722 and 732 so that the user can change the focus point using the slider 722 and can choose the depth of field using the slider 732. In this manner, the user of the computer 202 can decide which of the multiple images 115 to combine to compose the final image.

FIGS. 8A and 8B collectively illustrate another alternative embodiment of the invention. FIG. 8A illustrates a user interface provided by dialog box 810 that includes a lens shift adjustment feature. FIG. 8B illustrates a user interface provided by dialog box 820 that includes an image plane tilt adjustment feature. The terms "tilt" and "shift" refer to movement of the lens of a conventional camera with respect to the image plane. For example, the term "tilt" refers to physically tilting the lens with respect to the image plane, while the term "shift" refers to the axial movement of the lens with respect to the image plane.

In conventional photography, lens tilt and shift compensate for a phenomenon known as keystone distortion. Keystone distortion refers to distortion in which an object located closer to the lens appears wider than an object located further away from the lens. This embodiment of the invention allows the multiple exposures 115 to be taken as the lens 128 is moved through various focal lengths. After the multiple images are captured, the image capture software 150 (FIG. 1) (250 FIG. 2) and the user interface 160 (FIG. 1) (260 FIG. 2) can be used to simulate lens tilt and shift after the image is captured. The user interface dialog boxes 810 and 820 of FIGS. 8A and 8B, respectively, allow a user of the computer to use the slider 812 to adjust the lens shift and then slider 822 to adjust the image plane tilt with respect to all of the images 115. In this manner, the user can control and select the lens shift and the image plane tilt that best suits their needs for the final image.

While various embodiments of the invention have been described, it will be apparent to those of ordinary skill in the art that many more embodiments and implementations are possible that are within the scope of this invention. For example, while illustrated as capturing multiple images while adjusting the focus distance, other parameters can be varied between the multiple images. For example, the photographic techniques used between multiple images can also be varied. All such modifications and variations are intended to be included herein within the scope of this disclosure and the present invention and protected by the following claims.

What is claimed is:

1. A digital image capture and processing system comprising:
    a lens coupled to a lens control element;
    an image sensor configured to capture images from the lens;
    a memory element and a processor coupled to the lens control element, the memory element including image capture software, where the image capture software cause the lens and the image sensor to capture at least two images, each of the at least two images captured using a varying parameter and stored as a single file, where the at least two images are combined to form a new image having at least one characteristic different from corresponding characteristics of the at least two images;
    a user interface associated with the image capture software, where the user interface allows the user to combine attributes of the at least two images to form the new image, wherein the user interface further comprises a lens shift and an image plane tilt adjustment, a lens shift referring to a physical shift of the lens in a vertical direction or a horizontal direction with respect to an image plane and a plane tilt referring to a physical tilt of the lens with respect to the image plane, wherein the image capture software and the user interface are used to simulate at least one of the lens shift and plane tilt characteristics in the new image by capturing the at least two images at a plurality of focal lengths; and
    a depth of field indicator assigned to each of the at least two images, where the depth of field indicator allows a user to determine a depth of field for each of the at least two images.

2. The system of claim 1, wherein the varying parameter is focus distance.

3. The system of claim 1, wherein the user interface allows the different focus of each of the at least two images to be blended into the new image that includes an apparent focus between the two focus distances.

4. The system of claim 3, further comprising:
    a lens position indicator configured to indicate the position of the lens for each of the at least two images;
    a focus determination element configured to analyze each of a plurality of regions associated with each of the at least two images, the focus determination element also configured to determine whether each of the plurality of regions are in focus; and
    where the image capture software assembles each of the in-focus regions into the new image.

5. The system of claim 4, further comprising a distance indicator assigned to each of the regions, the distance indicator configured to assign a distance measurement to an alpha channel for each region.

6. The system of claim 1, wherein the user interface includes a depth of field adjustment that allows a user to select the depth of field of the new image from the depth of field of each of the at least two images.

7. The system of claim 1, wherein a first of the at least two images is captured using conventional photography and a second of the at least two images is captured using infrared photography.

8. The system of claim 1, wherein the varying parameter comprises the number of bits used by each pixel in the image sensor.

9. A method for operating a digital image capture and processing device, the method comprising the steps of:
    coupling a lens to a lens control element;
    coupling an image sensor to the lens;
    capturing at least two images, each of the at least two images captured using a varying parameter, where the at least two images are combined to form a new image having at least one characteristic different from corresponding characteristics of the at least two images;
    storing the at least two images as a single file;
    assigning a depth of field indicator to each of the at least two images;
    determining a depth of field for each of the at least two images;
    providing lens shift and image plane tilt indicators, a lens shift referring to a physical shift of the lens in a vertical direction or a horizontal direction with respect to an image plane and plane tilt referring to a physical tilt of the lens with respect to the image plane;
    simulating at least one of the lens shift and plane tilt characteristics in the new image from the at least two images captured at a plurality of focal lengths; and
    combining attributes of the at least two images to form the new image.

10. The method of claim 9, wherein the varying parameter comprises focus distance.

11. The method of claim 9, further comprising the step of blending each of the at least two images into the new image that includes an apparent focus between the focus distance of each of the at least two images.

12. The method of claim 11, further comprising the steps of:
    indicating the position of the lens for each of the at least two images;
    dividing each of the at least two images into a plurality of regions;
    analyzing each of the regions to determine whether each of the plurality of regions are in focus; and assembling each of the in-focus regions into the new image.

13. The method of claim 12, further comprising the step of assigning a distance indicator to each of the regions, the distance indicator configured to assign a distance measurement to an alpha channel for each region.

14. The method of claim 9, further comprising the step of using a depth of field adjustment to select the depth of field of the new image from the depth of field of each of the at least two images.

15. The method of claim 9, further comprising the steps of:
    capturing a first of the at least two images using conventional photography; and
    capturing a second of the at least two images using infrared photography.

16. The method of claim 9, further comprising the step of varying the number of bits used by each pixel in the image sensor.

17. An image processing system, comprising:
    an image storage device;
    at least two similar images contained in the image storage device;
    a processor coupled to the image storage device;
    a code segment for processing the at least two similar images, where the at least two similar images are combined to form a new image having at least one characteristic different from corresponding characteristics of the at least two images, the at least one characteristic including at least one of lens tilt and lens shift characteristics, a lens shift referring to a physical shift of the lens in a vertical direction or a horizontal direction with respect to an image plane and a plane tilt referring to a physical tilt of the lens with respect to the image plane; wherein the code segment simulates at least one of the lens shift and plane tilt characteristics in the new image from the at least two images captured at a plurality of focal lengths; and
    an output element for rendering the new image.

18. The system of claim 17, wherein the image processing system is contained within an image capture device such that the at least two similar images are captured by the image capture device and placed in the image storage device.

19. The system of claim 18, where the image processing system instructs the image capture device to vary at least one parameter of the image capture device so that the at least two similar images differ due to the variance of the at least one parameter.

20. The system of claim 19, wherein the at least one parameter includes image illumination.

21. The system of claim 18, wherein the image storage device for one of the at least two similar images is the image sensor of the image capture device.

22. The system of claim 17, wherein the at least one characteristic includes different depth of field.

23. The system of claim 17, wherein the at least one characteristic includes different exposure.

24. The system of claim 17, wherein the at least two similar images differ primarily in focus.

25. The system of claim 17, where the at least two similar images differ in color.

26. The system of claim 17, wherein a first of the at least two similar images is captured using visible light and the second of the at least two similar images is captured using infrared exposure.

* * * * *

UNITED STATES PATENT AND TRADEMARK OFFICE
CERTIFICATE OF CORRECTION

PATENT NO. : 7,084,910 B2  Page 1 of 1
APPLICATION NO. : 10/071026
DATED : August 1, 2006
INVENTOR(S) : Frederic C Amerson et al.

It is certified that error appears in the above-identified patent and that said Letters Patent is hereby corrected as shown below:

In column 12, line 47, in Claim 9, after "plane and" insert -- a --.

Signed and Sealed this

Fifth Day of May, 2009

JOHN DOLL
*Acting Director of the United States Patent and Trademark Office*